United States Patent [19]

Inoue et al.

[11] Patent Number: 5,075,807
[45] Date of Patent: Dec. 24, 1991

[54] MAGNETIC DISK DEVICE INCLUDING HUMIDITY CONTROLLER IN DISK ENCLOSURE

[75] Inventors: Yoichi Inoue, Ryugasaki; Katsuyuki Tanaka, Ibaraki; Hideaki Amano, Odawara, all of Japan

[73] Assignee: Hitachi, Ltd., Tokyo, Japan

[21] Appl. No.: 493,318

[22] Filed: Mar. 14, 1990

[30] Foreign Application Priority Data

Mar. 15, 1989 [JP] Japan ................................ 1-61002

[51] Int. Cl.$^5$ .............................................. G11B 5/012
[52] U.S. Cl. ............................... 360/97.02; 360/97.03; 360/137; 236/44 R
[58] Field of Search ................... 360/97.02, 97.03, 137; 236/44 R; 423/210

[56] References Cited

U.S. PATENT DOCUMENTS

| | | | |
|---|---|---|---|
| 4,307,425 | 12/1981 | Kaneko et al. | 360/97.03 |
| 4,599,670 | 7/1986 | Bolton | 360/137 X |
| 4,620,248 | 10/1986 | Gitzendanner | 360/97.02 |
| 4,642,715 | 2/1987 | Ende | 360/97.02 |
| 4,684,510 | 8/1987 | Harkins | 360/97.02 |
| 4,831,475 | 5/1989 | Kakuda et al. | 360/97.03 |
| 4,863,499 | 9/1989 | Osendorf | 360/97.02 |
| 4,967,295 | 10/1990 | Yamauchi et al. | 360/137 |

FOREIGN PATENT DOCUMENTS

| | | | |
|---|---|---|---|
| 56-13570 | 2/1981 | Japan . | |
| 58-56270 | 4/1983 | Japan | 360/97.03 |
| 59-33683 | 2/1984 | Japan | 360/97.03 |
| 61-92492 | 5/1986 | Japan | 360/97.03 |
| 61-178790 | 8/1986 | Japan | 360/97.03 |
| 63-96789 | 4/1988 | Japan | 360/97.02 |
| 1-48292 | 2/1989 | Japan | 360/97.02 |

Primary Examiner—Aristotelis Psitos
Assistant Examiner—Alfonso Garcia
Attorney, Agent, or Firm—Antonelli, Terry, Stout & Kraus

[57] ABSTRACT

There is provided a magnetic recording device including recording mediums and an airtight enclosure containing the recording mediums therein and having a fine breathing hole created therethrough communicating with the outside thereof, wherein at least two types of moisture adsorbents composed of a one way type moisture adsorbent which adsorbs moisture and a reversible type moisture adsorbent which adsorbs moisture in high humidity and conversely discharges the same in low humidity are disposed in the cabinet and used in combination. There is also provided the same device except wherein gas adsorbents and moisture adsorbents are used in combination.

8 Claims, 3 Drawing Sheets

MAGNETIC DISK DEVICE INCLUDING HUMIDITY CONTROLLER IN DISK ENCLOSURE

BACKGROUND OF THE INVENTION

1. Field of the Invention

The present invention relates, to recording mediums, and more specifically, to a magnetic disk device in which thin film magnetic disk recording mediums as a continuous film are mounted.

2. Related Art

Conventional magnetic disk devices have kept the interior thereof in a low humidity state by removing moisture flowing thereinto by using a moisture adsorbent as disclosed in Japanese Patent Application Kokai (Laid-Open) No. Sho 56-13570, or extended the life thereof by using only a reversible moisture adsorbent as disclosed in U.S. Pat. No. 4,831,475. Further, it is generally known that activated charcoal is used to remove various gases.

The above conventional technologies, however, do not sufficiently consider an environmental control taking the life of the device into account or an arrangement of the moisture adsorbent taking the size of the device into account. In particular, since thin film magnetic disk recording mediums are generally composed of non-oxide type magnetic substances, they react with moisture in the atmosphere or corroded by corrosive gases. Therefore, to increase the reliability of the recording mediums, moisture and gases flowed into the device must be sufficiently removed. However, there is a problem in providing an adsorbent which sufficiently complies with this requirement and provides a recording medium with reliability. Further, recently magnetic disk devices have been made smaller in size and thus the space thereof in which the adsorbent can be mounted is limited, so that it is difficult to realize a corrosion resistant environment in the device to satisfy the life length requirement thereof.

OBJECTS AND SUMMARY OF THE INVENTION

It is an object of the present invention to provide a magnetic disk device in which an adsorbent is effectively arranged taking into consideration the characteristics of the adsorbent whereby a practical amount of the adsorbent for mounting thereof enables effective adsorption even in the case of rapid temperature elevation and the device has an increased reliability for a long duration.

To achieve the above objects, the present invention selects types of adsorbents which most effectively act in a small magnetic disk device by classifying corrosive characteristics of an environment and the characteristics of the adsorbents corresponding to the corrosive characteristics and arranges them in the device most effectively in such a manner that: one way and reversible type moisture adsorbents are used to polar molecules such as moisture of the substances which exist in the atmosphere as one of corrosive factors to recording mediums and the like to keep the relative humidity thereof to a low level for a long time; and a gas adsorbent such as a mixture of $KM_nO_4$, $H_3PO_4$ and $KOH$ is used to non-polar molecules of corrosive gases such as $SO_2$ and $H_2S$, and thus the moisture adsorbent and the gas adsorbent are exclusively used for the respective purposes thereof and arranged in order of gas adsorbent and moisture adsorbent from a breathing hole so that adsorbing and removing efficiency is increased by accelerating gas adsorption reaction.

Note that numerals in the figures are designated as follows.

1 ... enclosure, 2 ... recording medium, 3 ... breathing hole (ventilation hole), 4 ... adsorbent case, 5 ... gas adsorbent, 6 ... silica gel (moisture adsorbent), 7 ... dust preventing filter, 8 ... spiral breathing hole (ventilation hole), 9 ... gas adsorbent, 10 ... reversible type silica gel, 11 ... one way type silica gel, 12 ... adsorbent case, 13 ... dust preventing filter, 14 ... opening, 15 ... diaphragm hole

DETAILED DESCRIPTION OF THE PREFERRED EMBODIMENT

Figure 7:
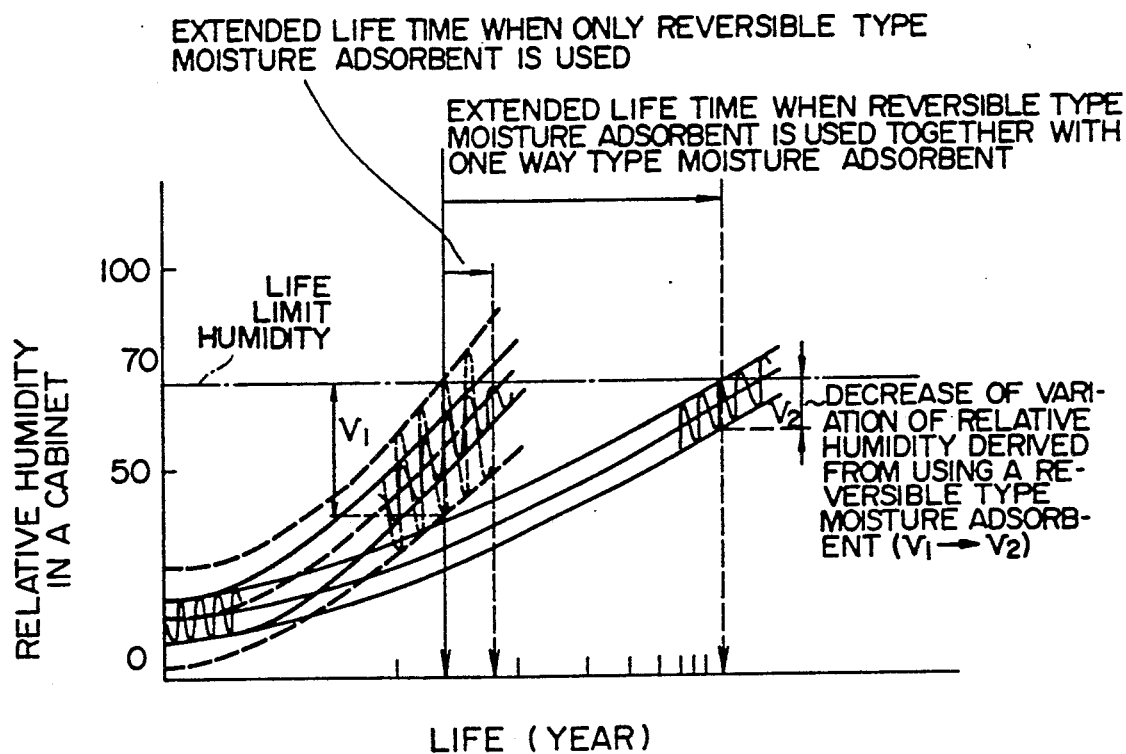
FIG. 7 is a diagram of the relationship between relative humidity and life schematically showing the actions of moisture adsorbents according to the present invention.

The action of two types of moisture adsorbents will be described with reference to FIG. 7. It is assumed that a container or enclosure of a given volume has a fine hole created therethrough, humid air enters there through the hole, and the container has a temperature cycle between day and night. An increase in relative humidity inside the container is caused by two factors, an entrance of the humid air and a decrease in temperature. In general, a disk device has a specific humidity (e.g., 70%) at which the life thereof is terminated and a period of time elapsed until the humidity is reached is considered to be the life.

To extend the life, it is preferable to use in combination a moisture adsorbent for adsorbing the entered humid air and a reversible type moisture adsorbent acting to restrict the variation range of the relative humidity inside the device. FIG. 7 shows that the life can be greatly extended by the use of them in combination. More specifically, it shows that when average humidity has lower increasing gradients, i.e., the more one way type adsorbent is used together with the reversible type moisture adsorbent, the more the life can be effectively extended by the decrease in the variation made by using the reversible type adsorbent.

Further, corrosive gases such as $SO_2$, $NO_2$, $H_2S$, $O_2$, $Cl_2$, $CH_3CHO$, etc. which exist in the atmosphere as a corrosive factor to the recording mediums other than moisture are adsorbed and removed by a gas adsorbent composed of $KMnO_4 + H_3PO_4 + KOH$, etc, whereby these gases can be effectively adsorbed and removed. A gas adsorbent of potassium permanganate, $KMnO_4$, known as a substance effectively adsorbing corrosive gases, reacts with $H_2O$ with respect to $SO_2$, etc., as shown in the following formula, and thus it has higher adsorbing efficiency in a humid environment.

$$3SO_2 + 2KMnO_4 + 2H_2O \rightarrow K_2SO_4 + 2H_2SO_4 + 2MnO_2$$

Further, it produces $H_2O$ and increases environmental humidity with respect to $H_2S$, etc. at an adsorption reaction, as shown in the following formula, and thus dehumidification is necessary after the reaction has been carried out.

$$3H_2S + 8KMnO_4 \rightarrow 3K_2SO_4 + 8MnO_2 + 2KOH + 2H_2O$$

When considering either of the reactions, the arrangement of the gas adsorbent and the moisture adsorbent in this order from a breathing hole enables moisture to be removed by the moisture adsorbent after gases have been adsorbed, and thus the contents of the moisture and gases in the interior of the device can be effectively lowered. Further, the life of a recording medium and the like can also be greatly extended by employing a breathing hole composed of a valve which is opened only when a pressure difference is produced between the outside and the inside of the device or employing a ventilation hole composed of a fine tube wound to a spiral shape so that a dispersing inflow of the above gases and moisture from the outer air is restricted.

In the present invention, the one way type moisture adsorbent is defined such that it can adsorb moisture until it is saturated, but it cannot discharge the adsorbed moisture even if the moisture in the outer environment is reduced, and this type of the moisture adsorbent includes, for example, silica gel and silica alumina type molecular sieves which usually are widely used as a moisture adsorbent.

Further, the reversible type moisture adsorbent is defined such that it can discharge or adsorb moisture in accordance with the change of the moisture contained in an outer environment and this type of the moisture adsorbent includes, for example, silica gel having a reversible moisture adsorbing property.

The gas adsorbent is a compound, which reacts with various types of harmful gases contained in air and injuring the material of a recording unit of a magnetic disk such as, for example, $SO_2$, $H_2S$, $NO_2$, etc. and changes them to solid compounds, and a substance having a property capable of adsorbing and immobilizing these gases, and the former includes a compound such as $KMnO_4$, $H_3PO_4$, $KOH$, etc. and the latter includes activate charcoal, molecular sieving carbon, etc. Both of them can of course be used in combination. When an oxide compound and an alkali compound are used in combination, they must be separated each other so that no reaction is caused therebetween. In addition, the gas and moisture adsorbents may be used in mixture.

The valve arranged as the breathing hole, which is opened when a pressure difference is produced between the outside and the inside of the device, includes a valve having a function to be automatically opened and closed by the pressure difference produced, and an example of which is a plate-shaped member composed of rubber and having a cutout created thereto to enable it to be opened and closed by the pressure difference.

Further, the breathing hole composed of the fine tube wound to the spiral shape preferably includes a fine tube having a large ratio of (L/A), where L is a length of the tube and A is a cross sectional area thereof. Any material can be used for the fine tube so long as it is inactive to harmful gases, and it is composed, for example, of plastics or alloy metal.

In the present invention, the gas adsorbent or a case containing it is disposed in the vicinity of the breathing hole and the moisture adsorbent or a case containing it is disposed on the above case, and a dust preventing filter is interposed therebetween, as necessary.

Thus, a magnetic disk device having a long life can be provided.

EXAMPLE

Examples of the present invention will be described below with reference to FIGS. 1 to 6.

Figure 1:
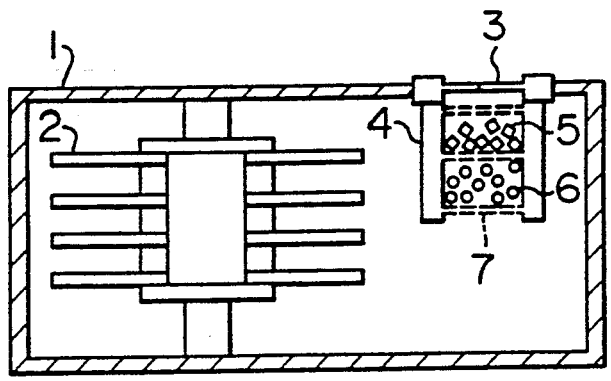
FIG. 1 is a cross sectional view of an example of a magnetic disk device according to the present invention.

FIG. 1 is a cross sectional view of an example of a magnetic-disk device according to the present invention, wherein recording mediums 2 and a spindle motor (not shown) for rotating the recording mediums piled in axial direction thereof are contained in an enclosure 1 of the magnetic disk device. On the other hand, a head (not shown) for recording and reproducing information is mounted on the enclosure. The enclosure 1 is provided with a breathing hole 3 (ventilation hole) passing from the inside to the outside thereof. The enclosure 1 does not have any portions communicating with the outside thereof except the breathing hole, and thus it is perfectly sealed therefrom. The breathing hole 3 is composed of a valve (for example, rubber valve) and arranged such that it is opened only when a pressure difference exists between the outside and the inside of the device and closed when there is no pressure difference therebetween. An adsorbent case 4 is disposed in connection with the breathing hole 3, and a gas adsorbent 5 mainly composed of potassium permanganate $KMnO_4$ for adsorbing non-polar gases and a moisture adsorbent (silica gel) 6 for adsorbing polar humid air are arranged from the breathing hole (ventilation hole) 3 in this order. Dust preventing filters 7 are disposed before and behind the gas adsorbent 5 and the moisture adsorbent (silica gel) 6 to keep the interior of the enclosure clean.

With this arrangement, when the magnetic disk device starts or stops operation, a change of temperature or wind pressure causes air to flow into the enclosure from the outside thereof through the breathing hole (ventilation hole) 3. At the time, although harmful gases simultaneously flow into the enclosure when they exist in the outside, the gas adsorbent 5 composed of the mixture of $KMnO_4$, $H_3PO_4$ and $KOH$ can effect an adsorption reaction with the harmful gases flowing into the device through the breathing hole 3 to remove them. Here, the following adsorption reaction is effected with respect to hydrogen sulfide $H_2S$, acetaldehyde $CH_3CHO$, ammonia $NH_3$, sulfur dioxide $SO_2$ and nitrogen dioxide $NO_2$.

$$3H_2S + 8KMnO_4 \rightarrow 3K_2SO_4 + 8MnO_2 + 2KOH + 2H_2O \quad (1)$$

$$3CH_3CHO + 2KMnO_4 + KOH \rightarrow 3CH_3COOK + 2MnO_2 + 2H_2O \quad (2)$$

$$3NH_3 + H_3PO_4 \rightarrow (NH_4)_3PO_4 \quad (3)$$

$$3SO_2 + 2KMnO_4 + 2H_2O \rightarrow K_2SO_4 + 2H_2SO_4 + 2MnO_2 \quad (4)$$

$$3NO_2 + 2KMnO_4 + H_2O \rightarrow KNO_3 \rightarrow 2HNO_3 + MnO_2 \quad (5)$$

It is found that the reactions in the formulas (4) and (5) are preferably effected in a highly humid environment and moisture produced in the reactions in the formulas (1) and (2) is preferably removed. That is, this means that it is important to cause moisture to be further adsorbed and removed by the next moisture adsorbent (silica gel) 6 after the adsorption reaction has been effected. The results of them experimentally confirmed will be described with reference to FIGS. 2 and 3.

Figure 2:
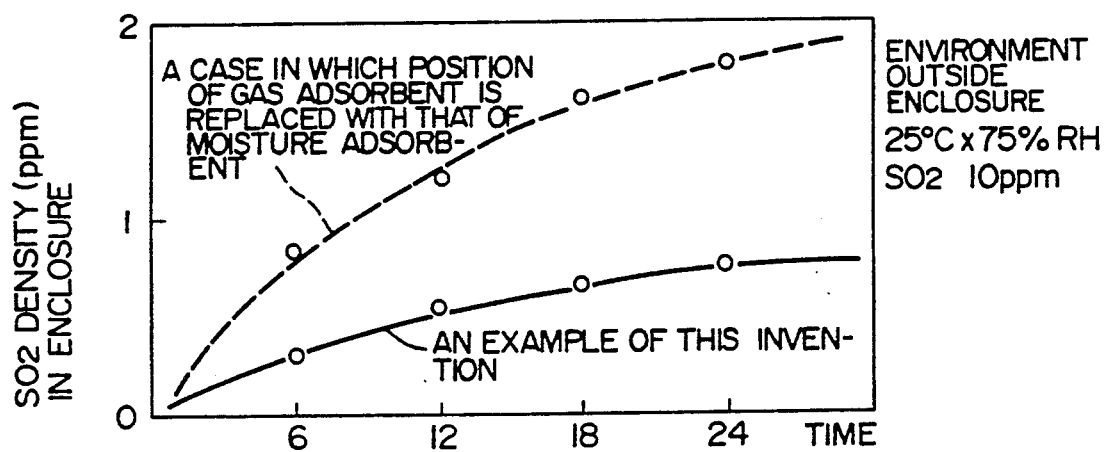
FIG. 2 is a characteristic diagram of the test results of $SO_2$ density in the device of FIG. 1.

FIG. 2 is a characteristic diagram of the test results of $SO_2$ gas density in the device of FIG. 1 and shows the effect thereof, wherein a horizontal axis shows time and a vertical axis shows $SO_2$ density (ppm) in the device, and a solid line shows the characteristics of the example shown in FIG. 1 and a broken line shows the characteristics thereof obtained when the position of the gas adsorbent 5 is replaced with that of the moisture adsorbent 6. Here, the environment outside the enclosure had a temperature of 25° C., a humidity of 75% RH and a density of sulfur dioxide of 10 ppm, and the magnetic disk device shown in FIG. 1 and the magnetic disk device in which the position of the gas adsorbent 5 was replaced with that of the moisture adsorbent 6 in the adsorbent case 4 in FIG. 1 were placed in the environment and the densities of the sulfur dioxides in the devices which changed as time passed were measured. At the time, 1.5 g of the gas adsorbent 5 and 6.0 g of the moisture adsorbent 6 were placed in each of the enclosures having a volume of 480 $cm^3$ and the valve serving as the breathing hole 3 of each enclosure was forcibly opened to have a cross sectional area of 0.9 $mm^2$, and the enclosures were left in this state. As a result, the first example had a $SO_2$ density of about 0.75 ppm and approached a saturated state at the timing when 24 hours had elapsed, whereas the enclosure in which the position of the gas adsorbent 5 was replaced with that of the moisture adsorbent 6 had a $SO_2$ density of about 1.8 ppm which was twice higher than that of the first example. This proves that it is effective to adsorb the $SO^2$ gas by the gas adsorbent 5 before moisture is adsorbed by the moisture adsorbent 6 as shown in FIG. 1, because moisture is necessary to adsorb the $SO_2$ gas in the formula (4).

Figure 3:
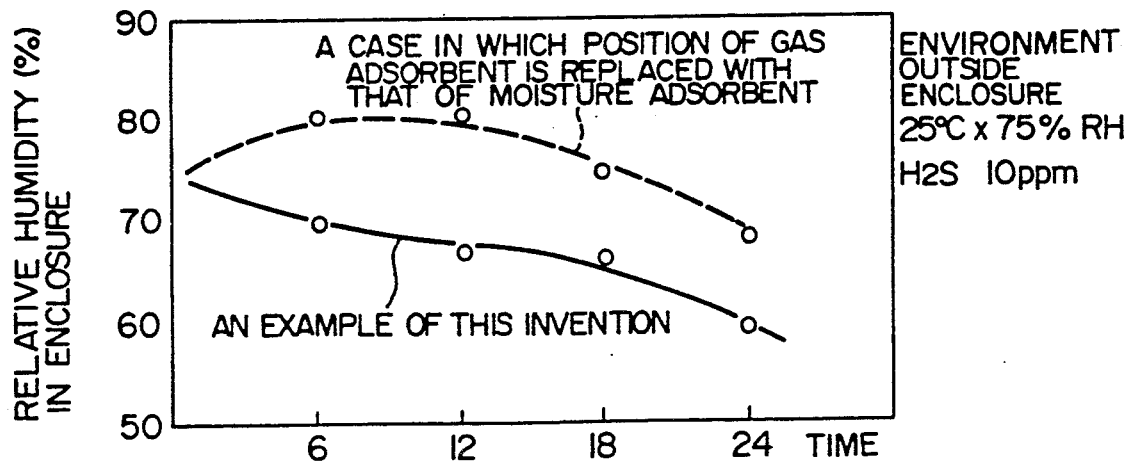
FIG. 3 is a characteristic diagram of the test results of relative humidity in the device of FIG. 1.

FIG. 3 is a characteristic diagram of the test results of relative humidity in the device of FIG. 1 and shows the effect of the device, wherein a horizontal axis shows time and a vertical axis shows relative humidity (%) in the enclosure, and a solid line shows the characteristics of the first example of FIG. 1 and a broken line shows the characteristics thereof obtained when the position of the gas adsorbent 5 was replaced with that of the moisture adsorbent 6. Here, the environment outside the enclosure had a temperature of 25° C., a humidity of 75% RH and a density of hydrogen sulfide of 10 ppm as in FIG. 2, and an experiment as in FIG. 2 was carried out to measure relative humidity in the device accompanied by the elapse of time. The results of the experiment show that the hydrogen sulfide $H_2S$ having the density of 10 ppm outside the enclosure enables the first embodiment to more effectively realize a low humid environment in the enclosure with lower relative humidity (%) as compared with the device in which the position of the gas adsorbent 5 was replaced with that of the moisture adsorbent 6. This is because that moisture is discharged when $H_2S$ is adsorbed by the gas adsorbent 5 before moisture is adsorbed by the moisture adsorbent 6 in the formula (1), as shown in FIG. 1.

According to this example, there is an advantage to effectively remove harmful gases and moisture flowing into the enclosure from the outside through the breathing hole (ventilation hole) thereof, and further an advantage to extend the life of the adsorbents because there is provided the breathing hole composed of the valve structure which does not breath by diffusion when the magnetic disk device is at rest.

Figure 4:
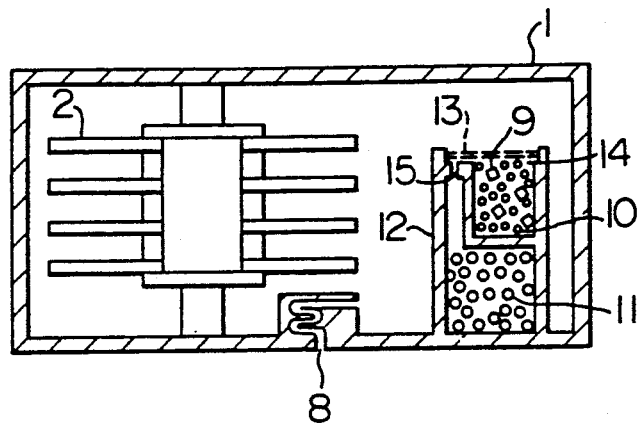
FIG. 4 is a cross sectional view of another example of a magnetic disk device according to the present invention.

FIG. 4 is a cross sectional view showing another example of the magnetic disk device according to the present invention, wherein metal thin film recording mediums 2 and a means (not shown) for recording or reproducing information to or from it are contained in an enclosure 1 of the magnetic disk device. The enclosure 1 is communicated with the outside thereof only through a spiral breathing hole (ventilation hole) 8 created therethrough and all the portions thereof except the hole are perfectly sealed from the outside. The breathing hole 8 is composed of a spiral fine tube. Further, an adsorbent case 12 composed of two compartments is disposed in the enclosure 1. One of the compartments contains a mixture of $KMnO_4$, $H_3PO_4$ and $KOH$ or a mixture of a gas adsorbent 9 such as activated charcoal, etc. and moisture adsorbing and discharging reversible type silica gel (reversible type moisture adsorbent) 10, and the other thereof contains moisture adsorbing one way type silica gel (one way type moisture adsorbent) 11. The former case which contains reversible type moisture adsorbent has an opening 14 which is large enough to be capable of instantly adsorbing almost all of the moisture generated in interior of the device. The latter case has a diaphragm hole 15 a size of which is sufficiently small to generate a pressure difference between the interior of the case and the outside the case and interior of the enclosure. In addition, a dust preventing filter 13 is disposed at the adsorbent case 12 to prevent dust from being dispersed from the moisture adsorbents 10 and 11. The filter 13 in this example serves as a filter for both an opening 14 and the diaphragm hole 15.

With this arrangement, an amount D of gases diffusingly flowing into the magnetic disk device from the outside through the breathing hole 8 is expressed by the following equation.

$$D = k \cdot A(C_{out} - C_{in})/L$$

where A represents the cross sectional area of the breathing hole, L represents the path length of the breathing hole, $C_{out}$ and $C_{in}$ represent the gas density outside and inside the enclosure, respectively, and k is constant. The amount of the inflow gases is restricted by making the breathing hole spiral so that it has a smaller cross sectional area A and a longer hole length L. Further, the gases flowing into the enclosure are removed by being adsorbed by the gas adsorbent 9, as in the example of FIG. 1. In addition, the usual moisture adsorbing one way type silica gel 11 is provided to improve the corrosion resistance against moisture of the recording mediums 2. A diaphragm 15 is interposed between the case of the one way type silica gel and interior of the device thereby the life of the silica gel is extended in the same mechanism as in the case of the breathing hole 8. Although the absolute humidity in the enclosure can be lowered by the one way type silica gel 11, there is a possibility that the relative humidity therein may be increased when the temperature of the device itself is changed. Thus, the moisture adsorbing and discharging reversible type silica gel 10 which repeatedly adsorbs and discharges moisture is used to cope with the temporary increase in the humidity. The opening 14 has a large enough size as described before effectively adsorbs moisture in the above case of relative humidity increase due to temperature increase. The moisture adsorbing characteristics of the above two types of the silica gel (moisture adsorbents) 11 and 10 will be described with reference to FIGS. 5 and 6.

Figure 5:
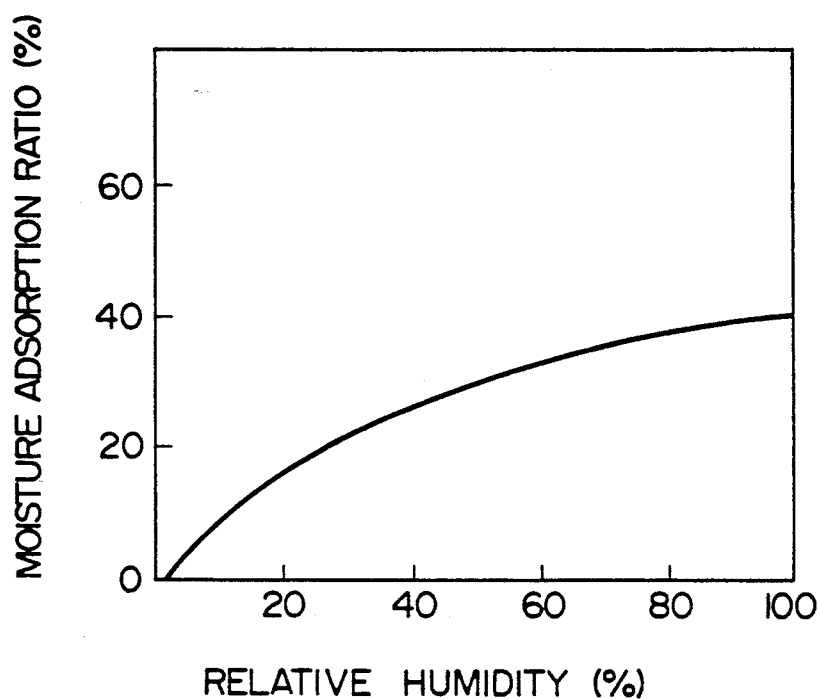
FIG. 5 is a moisture adsorption characteristic diagram of a one way type silica gel in FIG. 4.

FIG. 5 is a diagram of moisture adsorbing characteristics of the moisture adsorbing one way type silica gel 11 of FIG. 4, wherein a horizontal axis shows environmental relative humidity (%) and a vertical axis shows a moisture adsorbing ratio (%), i.e., a ratio of the weight of adsorbed moisture to the weight of the silica gel. As shown in FIG. 5, the conventional one way type silica gel 11 has an increasing moisture adsorbing ratio, as shown by a solid line, as the environmental relative humidity is increased and the moisture once adsorbed thereby cannot be discharged unless the silica gel is heated.

Figure 6:
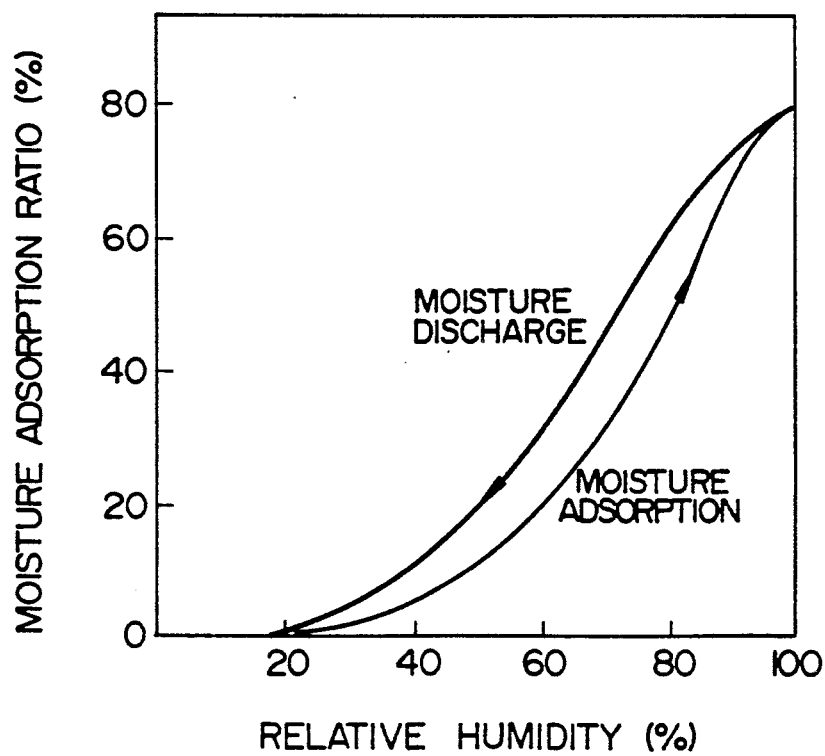
FIG. 6 is a moisture adsorption characteristic diagram of a reversible type silica gel in FIG. 4.

FIG. 6 is a diagram of moisture adsorbing characteristics of the moisture adsorbing and discharging reversible type silica gel 10 of FIG. 4 as in the above, wherein a horizontal axis shows environmental relative humidity (%) likewise and a vertical axis shows a moisture adsorbing ratio (%), i.e., a ratio of the weight of adsorbed moisture to the weight of the silica gel. As shown in FIG. 6, the moisture adsorbing and discharging reversible type silica gel 10 has an abruptly increasing moisture adsorbing ratio, as shown by an arrowed solid line, as the environmental relative humidity is increased. When, however, the environmental relative humidity is lowered from 60% to 40%, the silica gel 10 discharges once adsorbed moisture and the moisture adsorbing ratio thereof is more gradually lowered as shown by the arrowed solid line, and thus usually a constant humidity from 50 to 80% can be kept.

In this example, a mixture of 1.5 g of a gas adsorbent and 0.2 g of reversible silica gel 10 was disposed in a disk enclosure having a volume of 480 cm$^3$ as in the first example, and 2 g of one way silica gel 11 was additionally disposed therein. The disk device was left in the environment having a temperature of 25° C., a relative humidity of 75% RH and a density of sulfur dioxide $SO_2$ of 10 ppm as in the first example. As a result, a relative humidity in the enclosure was as low as 55% when 24 hours had passed. In addition, this relative humidity exhibited a tendency shown in FIG. 7 even if time further passed, whereby a lower humid environment could be kept for a long time regardless of that a total amount of the silica gel was less than that of the first example.

The case of the reversible silica gel 10 is provided with a structure having an opening 14 sufficiently large to be able to instantly adsorb moisture when the humidity inside the device rapidly increases. In other words, the opening of the case has no diaphragm. As described above, the use in combination of the two types of the moisture adsorbing and discharging reversible type silica gel (moisture adsorbent) 10 and the moisture adsorbing one way type silica gel (moisture adsorbent) 11 enables the interior of the magnetic disk enclosure to be kept in a low humidity state with a very small amount of the moisture adsorbents. Further, as described with reference to the first example of FIGS. 1 to 3, the characteristics of the gas adsorbent 9 is more effective when more humid air exists, and thus when it is mixed with the moisture adsorbing and discharging reversible type silica gel 10 which sometimes discharges moisture and used in the same compartment in the adsorbent chamber 12, the gas adsorbing efficiency of the gas adsorbent 9 can be improved.

According to the present example, the use in combination of the one way type moisture adsorbent and the reversible type moisture adsorbent enables the interior of the disk enclosure to be kept in a low humidity state for a very long period. Further, since harmful gases can be effectively removed, the environment in which the reliability of the recording mediums is improved can be realized.

The gas adsorbent in the above examples may be a mixture of $KMnO_4$, $H_3PO_4$ and $KOH$, activated charcoal, or molecular sieving carbon. The moisture adsorbing one way type adsorbent may be silica gel, silica alumina type molecular sieves or the like. Further, the moisture adsorbing and discharging reversible type moisture adsorbent is not limited to the silica gel. Furthermore, the breathing hole or the ventilation hole is not limited to the valve structure composed of the elastic member which is opened only when a pressure difference exists between the inside and the outside of the enclosure and usually closed, the spiral breathing hole, or the like.

According to the present invention, since the environment in the magnetic disk enclosure can be kept in a low humidity state for a long period by the use in combination of the one way and reversible type moisture adsorbents, high reliability can be achieved in that no corrosion is caused to the thin film disk recording mediums and the like. Further, harmful gases can be effectively removed.

What is claimed is:

1. A magnetic disk device comprising recording mediums and an airtight enclosure containing the recording mediums therein, having a fine breathing hole created therethrough and communicating with the outside thereof, wherein there are disposed in said enclosure a gas adsorbent and a moisture adsorbent, said moisture adsorbent having at least two types of moisture adsorbents including a one way type moisture adsorbent which adsorbs moisture and a reversible type moisture adsorbent which adsorbs moisture in high humidity and conversely discharges the same in low humidity whereby the life of the magnetic disk device is greatly extended as compared with the life using only a reversible type moisture adsorbent.

2. A magnetic disk device according to claim 1, wherein a first case means is disposed in said enclosure for containing said one way type moisture adsorbent, said first case means having a diaphragm hole capable of generating a pressure difference between inside and outside of the first case means, and wherein a second case means is disposed in said enclosure for containing said reversible type moisture adsorbent, said second case means having an opening, and wherein means are provided for filtering dust to prevent dust from exiting said first and second case means to keep the interior of the enclosure clean.

3. A magnetic disk device according to claim 1, wherein said fine breathing hole communicating with the outside is composed of a valve structure which is opened only when a pressure difference is produced between the outside and the inside of said enclosure.

4. A magnetic disk device according to claim 1, wherein said gas adsorbent effectively adsorbs corrosive gases existing in the atmosphere and is interposed in said enclosure between said breathing hole and said moisture adsorbents.

5. A magnetic disk device according to claim 1, wherein said gas adsorbent is also disposed in said enclosure between said breathing hole and said moisture adsorbent.

6. A magnetic disk device according to claim 4, wherein said gas adsorbent is disposed mixed with said reversible type moisture adsorbent.

7. A magnetic disk device according to claim 4, wherein said one way type moisture adsorbent and said reversible type moisture adsorbent are mixed together in said enclosure.

8. A magnetic disk device according to claim 1, wherein said one way type moisture adsorbent and said reversible type moisture adsorbent are mixed together in said enclosure.

* * * * *